United States Patent [19]
Repella

[11] 4,243,235
[45] Jan. 6, 1981

[54] COMPOSITE POLYTETRAFLUOROETHYLENE AND ELASTOMER LIP SEAL

[75] Inventor: James A. Repella, Southfield, Mich.
[73] Assignee: The Mather Company, Sylvania, Ohio
[21] Appl. No.: 54,181
[22] Filed: Jul. 2, 1979
[51] Int. Cl.³ .............................................. F16J 15/32
[52] U.S. Cl. ........................................ 277/152; 277/1; 277/228; 277/DIG. 6; 264/159
[58] Field of Search ................... 277/1, 9, 152, 153, 277/227, 165, 228, 159, 212 C, DIG. 6; 264/159

[56] References Cited

U.S. PATENT DOCUMENTS

| | | | |
|---|---|---|---|
| 2,213,116 | 8/1940 | Bernstein | 277/228 X |
| 2,802,513 | 8/1957 | Stoeckel et al. | 264/159 |
| 2,977,143 | 3/1961 | Talamonti | 277/227 |
| 3,206,829 | 9/1965 | Schaeffler et al. | 277/1 X |
| 3,428,375 | 2/1969 | Martin | 277/227 X |
| 3,565,445 | 2/1971 | Hodges | 277/9 X |
| 3,656,824 | 4/1972 | Ullberg | 277/95 X |
| 3,837,660 | 9/1974 | Poggio | 277/227 |
| 3,857,156 | 12/1974 | Clark | 277/1 X |
| 3,926,445 | 12/1975 | Farnam | 277/227 X |
| 3,929,341 | 12/1975 | Clark | 277/1 X |
| 3,980,309 | 9/1976 | Dechavanne | 277/165 X |
| 4,126,316 | 11/1978 | Cather | 277/9 X |
| 4,131,285 | 12/1978 | Denton et al. | 277/1 |
| 4,171,561 | 10/1979 | Bainard et al. | 277/153 X |

FOREIGN PATENT DOCUMENTS

| | | | |
|---|---|---|---|
| 975019 | 9/1975 | Canada | 277/1 |
| 544904 | 5/1942 | United Kingdom | 277/153 |
| 602746 | 6/1948 | United Kingdom | 277/153 |
| 674007 | 6/1952 | United Kingdom | 277/227 |

*Primary Examiner*—Robert S. Ward, Jr.
*Attorney, Agent, or Firm*—Hugh Adam Kirk

[57] ABSTRACT

A lip seal comprising a uniformly thin wafer of adjacent radical concentric sections of polytetrafluoroethylene and an elastomer, which elastomer is attached to a rigid annular member for mounting the seal. The polytetrafluoroethylene annular lip sealing portion may be either on the inner or outer circumference of the washer-shaped annular seal, and the rigid annular supporting member may be of a plastic or metal which is bonded and/or clamped to the elastomeric annular portion. The polytetrafluoroethylene annular portion of the wafer seal may be slit, grooved and/or formed to improve its flexibility and/or sealing action.

The combination polytetrafluoroethylene and elastomer wafers are formed by first fabricating a polytetrafluoroethylene tube or rod having a wall thickness corresponding at least to the radial thickness of the resulting washer, and then etching at least one of the cylindrical surfaces of this tube or rod to which the elastomer is next bonded in a mold. The resulting tube or rod of concentric bonded cylinders of elastomer and polytetrafluoroethylene is clamped at one end in a machine, such as a lathe, and the wafers or washers are knifed or slit off from the other end. If slits or grooves are to be cut into the polytetrafluoroethylene portion, such can be done in the same machine or lathe by another cutting tool prior to the slicing off of the washers.

11 Claims, 13 Drawing Figures

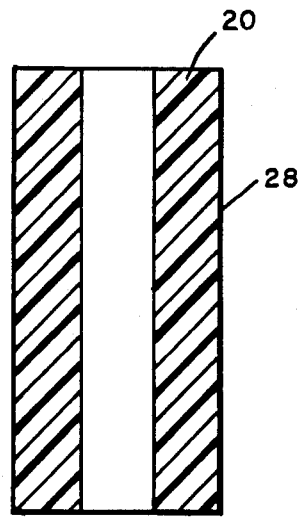
FIG. I
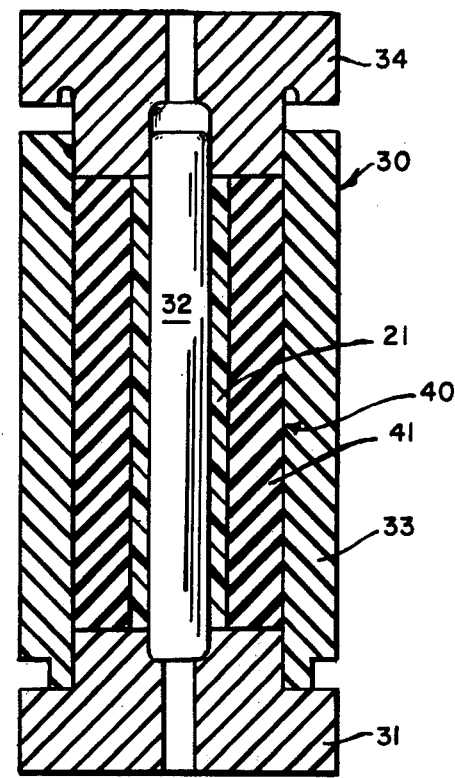
FIG. II
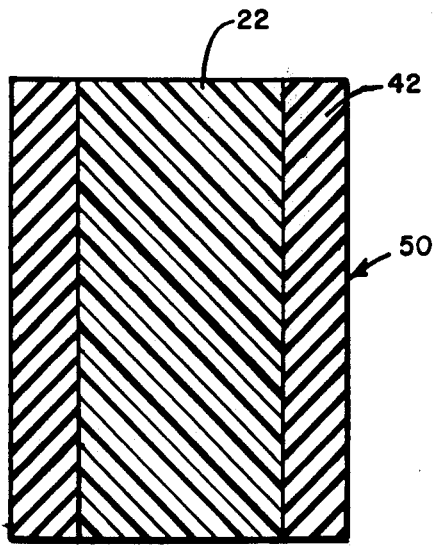
FIG. III
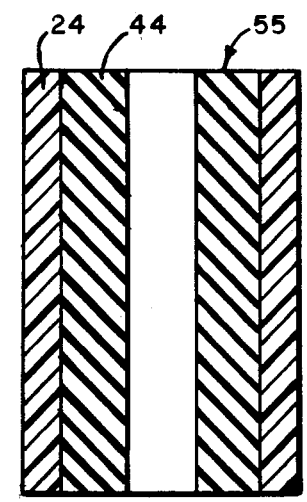
FIG. IV

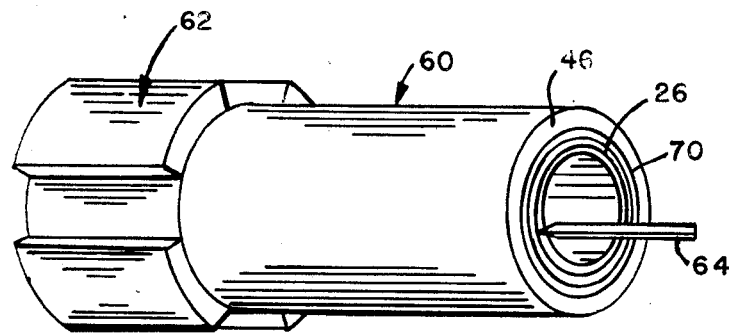
FIG. V
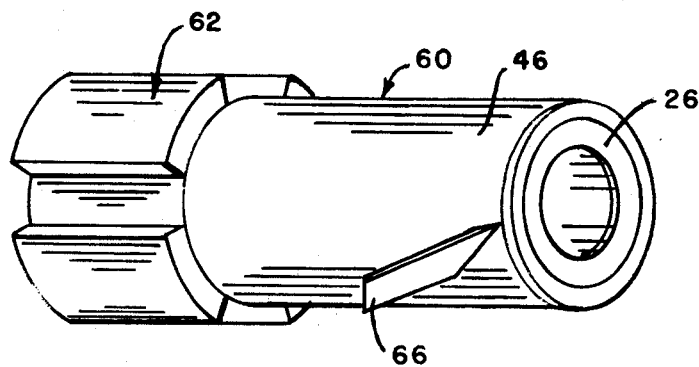 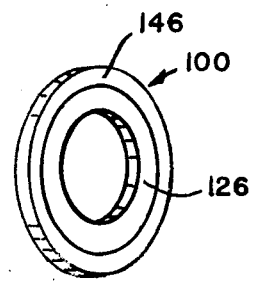
FIG. VI   FIG. VII
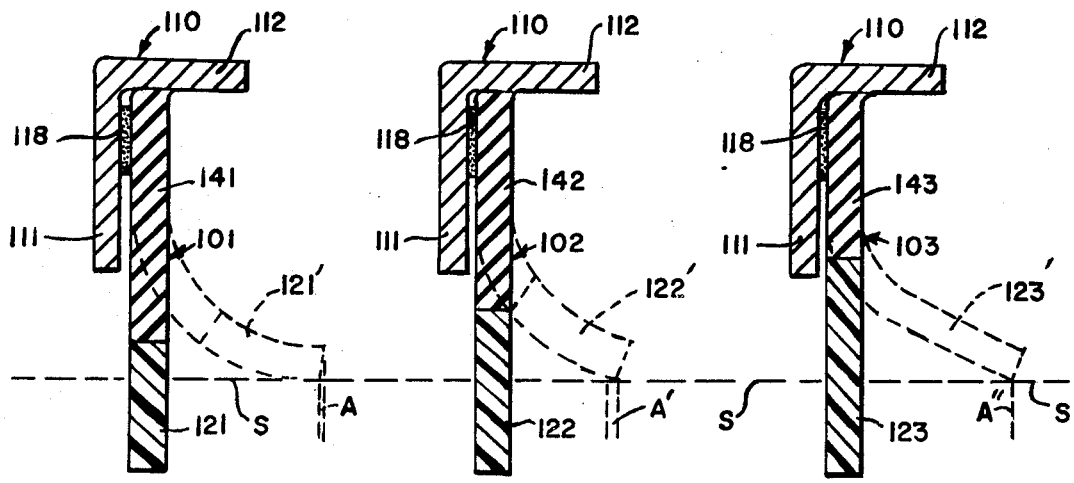
FIG. VIII   FIG. IX   FIG. X

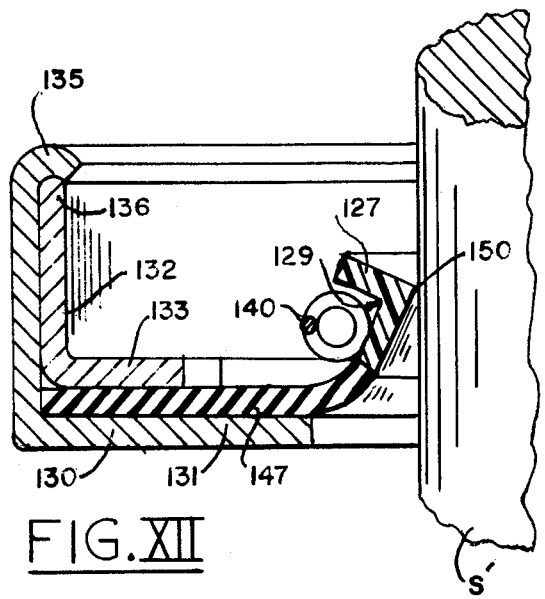
FIG. XII
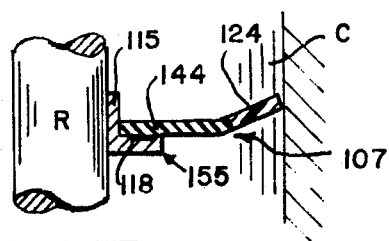
FIG. XIII
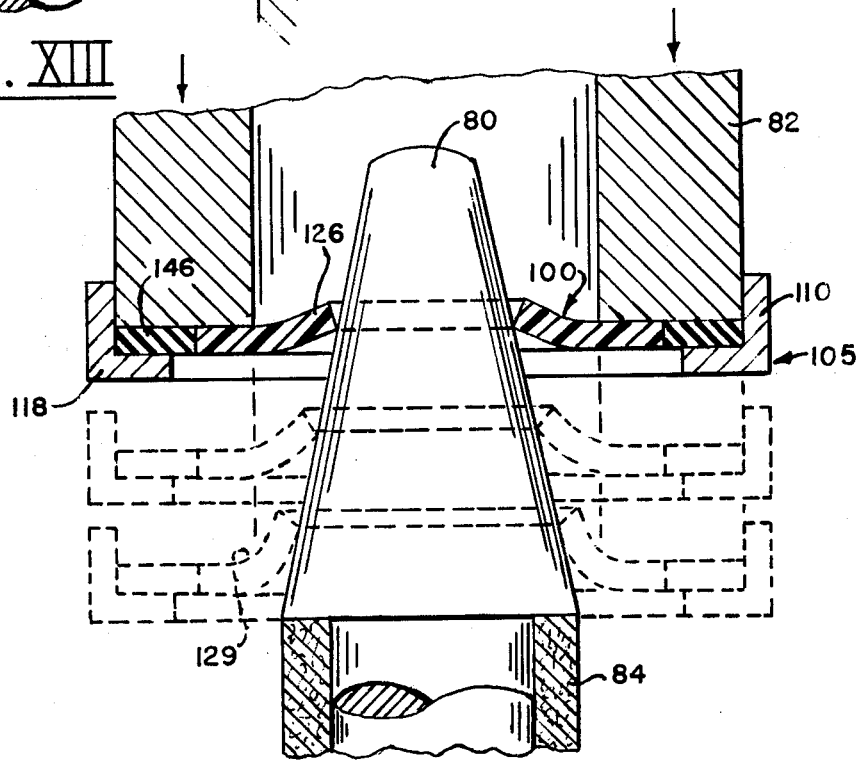
FIG. XI

COMPOSITE POLYTETRAFLUOROETHYLENE AND ELASTOMER LIP SEAL

BACKGROUND OF THE INVENTION

Previous composite polytetrafluoroethylene and elastomer or rubber type lip seals have not been substantially uniform in thickness and have usually been manufactured by being separately molded. That is, the polytetrafluoroethylene washer, wafer or lip-sealing part was fabricated and then each wafer was etched and placed into a mold where the elastomer or rubber for that wafer was molded thereon. The elastomer usually substantially surrounded at least one edge and part of one radial side of the polytetrafluoroethylene wafer, in that to make an abutting edge portion of rubber or elastomer of the same thickness as the polytetrafluoroethylene wafer would be practically impossible without also producing flash or overflow of elastomer at the joint. Furthermore, separately molded seals in multi-cavity molds often are not uniformly formed because they may not receive the same exact charge of elastomer, pressure and/or temperature.

It has always been a problem to make lip seals more flexible and more universal in their use. Also to form a thin section in the elastomeric or rubber portion of a combination lip seal to increase its flexibility, weakens the seal in that rubber fatigues in much less time than polytetrafluoroethylene at elevated temperatures.

Although polytetrafluoroethylene alone or rubber alone has been preformed into tubes and sliced into washers, never before has an elastomer also been formed concentric with polytetrafluoroethylene (PTFE) tube and sliced off therewith to produce a uniform and uniformly thin combination polytetrafluoroethylene and elastomeric wafer lip seal.

SUMMARY OF THE INVENTION

Generally speaking, the flexible combination lip seal of this invention comprises an annular wafer composed radially of two different sections; one of polytetrafluoroethylene and the other of an elastomer, each of which sections may vary in radial thickness between about 10% to 12% and 88% to 90% of whole radial thickness of the washer, which whole radial thickness may vary between about 0.15 and 2.0 inches. The substantially uniform axial thickness of this composite wafer ranges between about 0.008 and 0.125 inches, and preferably between about 0.020 and 0.070 inches and in outside diameter from about a half inch to about ten inches. The polytetrafluoroethylene portion may include a groove adjacent the junction between the polytetrafluoroethylene portion and the elastomeric portion to increase the flexibility of the wafer. The polytetrafluoroethylene portion of the seal also may be machined to provide a retainer for a greater spring.

Since the polytetrafluoroethylene portion is the portion highly resistant to wear and forms the lip of the seal, the housing or support for the seal is attached to the elastomeric portion and usually comprises a rigid annular ring which can be formed or bonded directly to the elastomer. This annular supporting member may be of a rigid plastic, such as a thermoplastic or of a metal, and may have an L-shaped radial cross-section forming a type of cup-shaped housing. The outer cylindrical surface of this cup may be coated, if desired, for easily sealing it into an opening. The elastomer portion of the wafer may be adhered to the radial flange portion of the cup support by an adhesive, or it may be clamped by a similar telescoping inner cup-shaped member between their two parallel radial flanges. Since the lip seals of this invention are usually used to prevent leakage of oil, it is desirable that the elastomers used, as well as the adhesives used, are oil-resistant. The adhesive may generally be selected from the class of oil-resistant adhesives employed for bonding a metal and rubber.

An important part of the lip seal of this invention is the process by which it is produced, namely the slicing of the wafers from a preformed tube or rod of concentric bonded cylindrical portions of polytetrafluoroethylene and an elastomer. This process comprises first the formation of the polytetrafluoroethylene tube or rod which can be extruded, molded and/or machined. The next step comprises etching at least the one cylindrical surface thereof to which the elastomer is to be bonded, and preferably also coating this surface with a cementing or bonding agent, preferably oil resistant, before placing this polytetrafluoroethylene tube in a mold, which preferably has a means for locating and supporting this tube or rod. The elastomer is then injected, transferred, or placed into the annular cylindrical space remaining in the mold adjacent the etched surface of the polytetrafluoroethylene to form integrally therewith a concentric tube of elastomer. The radial thicknesses of this tube or rod can be easily varied to correspond to between the 10% and 90% of the relative radial thicknesses of the two portions desired in the resulting wafer. After the elastomer is inserted into the mold, it may be cured and the resulting combined tube or rod is removed from the mold and one end thereof is chucked in a machine so that wafers can be sliced successively from the other free end of the tube or rod. Cutting tools can be used for slitting, grooving and then slicing off the wafers in relatively rapid succession. All of these composite wafers are of uniform composition and physical properties in their respective portions, since they are all formed from the same composite tube formed in a single mold.

The rigid annular ring or housing employed for supporting each wafer is attached to the elastomeric portion of the wafer and may be attached by being bonded and/or molded directly to the elastomer. Usually, however, this rigid annular support is of metal and bonded to the elastomeric portion directly by an adhesive against a parallel radially extending flange of the rigid annular support member or housing. If an adhesive is not to be used, a pair of telescoping cup-shaped rigid members may be employed for clamping the elastomeric portion between their parallel radial flanges and the outer member may then be crimped against the inner member to hold them in place.

If the polytetrafluoroethylene portion is to be further formed, such may be done by forcing the assembled lip seal over a tapered spindle. A plurality of such seals may be placed on a spindle for shipping and storage until ready for use.

OBJECTS AND ADVANTAGES

It is an object of this invention to produce a simple, efficient, effective, long-lasting, easy to manufacture, flexible lip seal which will effectively seal off-center and wobbly shafts in housings.

Another object is to produce a polytetrafluoroethylene lip seal which does not require a gasket between the sealing part or wafer and its housing or support.

Another object is to produce a polytetrafluoroethylene lip seal with a uniform lip load at start-up.

Another object is to produce such a composite lip seal which is not only versatile in its use, but which polytetrafluoroethylene portion can be changed easily in axial and radial thickness and annular surface configuration without changing its forming mold.

BRIEF DESCRIPTION OF THE VIEWS

The above mentioned and other features, objects and advantages and a manner of attaining them are described more specifically below by reference to embodiments of this invention shown in the accompanying drawings, wherein:

FIG. I shows a diametrical section of a polytetrafluoroethylene tube which may be used in manufacturing the lip seals of this invention;

FIG. II shows a diametrical section of a mold in which an elastomeric tube is being molded to the outer cylindrical surface of a preformed polytetrafluoroethylene tube similar to that shown in FIG. I;

FIG. III shows a diametrical section of a composite rod formed in a mold, comprising an inner portion of polytetrafluoroethylene and an outer portion of an elastomer.

FIG. IV is a diametrical section of a molded composite tube according to a further embodiment of this invention in which the polytetrafluoroethylene tube is outside the elastomeric tube;

FIG. V is a perspective view of a tube similar to that shown in the mold in FIG. II being chucked in a lathe and being grooved in the polytetrafluoroethylene portion adjacent the junction with the outer elastomeric portion;

FIG. VI is a perspective view similar to FIG. V showing the cut-off tool for making the thin washers or wafers of the lip seals according to this invention;

FIG. VII is a perspective view of a thin lip seal wafer or washer cut from the composite tube in FIG. VI and comprising an inner annular portion of polytetrafluoroethylene with the outer annular elastomeric or rubber portion;

FIGS. VIII, IX and X are enlarged radial cross-sections through assembled lip seals according to this invention wherein the relative radial thicknesses of the elastomeric and polytetrafluoroethylene portions are successively varied, the elastomeric portions are bonded by an adhesive to the radial metal flange of the L-shaped cross-sectional rigid supporting housing, and in dotted lines the different lay-down areas of the polytetrafluoroethylene portions on the cylindrical surface of a rotating shaft;

FIG. XI is an enlarged diametrical section of the end of a shipping tube with a conically-ended forming mandrel with an assembled lip seal with a wafer as shown in FIG. VII, being pushed to deform the polytetrafluoroethylene portion as shown in dotted lines as the seal moves axially along the mandrel;

FIG. XII is a further enlarged radial cross-section of a formed polytetrafluoroethylene portion of a lip seal for seating a garter spring, and in which the elastomeric portion is clamped between two rigid telescoping radial L-shaped cross-section supporting rings without a gasket;

FIG. XIII is a radial cross-section of still another type of an assembled lip seal in which the wafer is made from a composite tubular billet of the type shown in FIG. IV in which the polytetrafluoroethylene lip portion is shown contacting the inside of a cylindrical surface.

DETAILED DESCRIPTION OF THE PREFERRED EMBODIMENTS

Since the general composition of the composite lip seal of this invention is simple and straightforward and the different configurations which may be employed for the polytetrafluoroethylene portion thereof are mostly well-known in the art, the detailed description of this invention will be directed primarily toward the process of making these simple composite wafer or washer-type lip seal components.

Referring now first to FIG. I, there is shown a diametrical cross-section of a preformed polytetrafluoroethylene tube 20 which may be formed in any of the well-known manners of forming such tubes, such as extrusion, isostatic or compression molding, and sintering, and/or machining. This tube is fabricated so that its radial thickness will conform substantially with the radial thickness desired in the final assembled lip seal or product. In order for the elastomer to adhere intimately to the polytetrafluoroethylene tube, the cylindrical surface to which the elastomer is to be molded and bonded is etched such as by emersion of the tube 20 in a chemical bath of metallic sodium dissolved in liquid ammonia. In addition, to insure a good bond with the elastomer, the etched cylindrical surface also may be coated with an adhesive 28.

Next, the etched polytetrafluoroethylene tube 20, or 21 as shown in FIG. II, is placed in a mold 30 which may comprise a base portion 31 having a seat for a central mandrel 32 over which the tube 21 is centered and located. A hollow cylindrical housing 33 seats adjacent the periphery of the base 31, which housing has an inside diameter greater than the outside diameter of the polytetrafluoroethylene tube 21 to provide a cylindrical annular space corresponding to the radial thickness to the elastomeric portion of the resulting composite wafer or washer. This space is then filled with the desired elastomer 41 as shown in FIG. II and then the cover 34 is pressed onto the mold under heat and pressure until the elastomer integrally bonds to the outer cylindrical etched surface of the polytetrafluoroethylene tube 21 to form a composite tubular billet 40. The elastomeric material 41 forming the elastomeric portion of the lip seal of this invention is preferably a resilient plastic, such as rubber, but also may comprise a polyurethane, and may be injected, transferred or otherwise placed as a precharge of elastomer into the mold 30. This elastomer 41 may be cured before placing it onto and binding it to the polytetrafluoroethylene, or it may be vulcanized or cured in the mold.

Also, composite rods may be formed in a mold as shown in FIG. II. For example, rod 50 is shown in FIG. III to comprise a solid inner polytetrafluoroethylene cylindrical portion 22, and an outer elastomeric tubular portion 42.

An elastomer 44 similarly can be formed inside of a polytetrafluoroethylene tube 24 as shown for the billet 55 shown in FIG. IV, from which billet 55 seals 155 having lips 124 on the outer periphery can be produced for mounting on a central shaft R such as shown in FIG. XIII.

Referring now to FIGS. V, VI and VII, each of the composite tubular billets 40, 50 and 55 shown in FIGS. II, III and IV, after being removed from its mold, is then placed in a machine so that wafers or washers can be successively cut or sliced therefrom. One form of such a machine is to place one end of a composite billet tube 60 into chuck jaws 62 or a collet of a lathe or other machine for holding and rotating the tube 60 about its axis, and then slicing the washers 100 as shown in FIG. VII from the free end of the composite tube 60. It is to be understood, however, that the tube 60 may be stationary and the cutting tool may be rotated without departing from the scope of this invention.

One of the additional features of this invention is that the polytetrafluoroethylene part of the tube 60 herein shown as the inner portion 26 may have its exposed annular surface machined or cut. This surface machining may be to form a groove 70 therein by a tool 64 as shown in FIG. V, before the washer 100 is cut from the end of the tube by means of the knifing tool 66 as shown in FIG. VI. Furthermore, if desired, the billet 60, after being chucked in the chuck jaws 62, and before being machined and sliced, may have its inside and/or outside cylindrical surfaces machined to predetermined uniform diameters.

The composite washer or wafer 100 shown in FIG. VII or similar washer or wafers 101, 102, and 103 shown in FIGS. VIII, IX, and X, respectively, are then attached to a rigid annular housing 110 which may comprise a metal ring having both a radial and axially extending flanges 111 and 112, so that the radial cross-section of the housing 110 is L-shaped and the inside diameter of the axially extending flange 112 is substantially the same as the outside diameter of the washers 101, 102 and 103. In this manner the elastomeric portions 141, 142 and 143 of the wafers 101, 102 and 103, respectively, may then snugly fit into the housings 110. Herein these elastomeric portions 141, 142 and 143 are attached to the radial flanges 111 of these housings 110 by means of an adhesive 118, which preferably is oil-resistant and of the type normally employed for bonding metal to rubber.

One of the many advantages of the present invention is shown in FIGS. VIII, IX and X in which washers of different flexibilities can be formed of substantially the same outside shape and size in the same mold 30, by just changing the relative thicknesses of the elastomeric portions 141, 142 and 143 with respect to the polytetrafluoroethylene portions 121, 122 and 123. These different width lay-down contact areas A, A' and A" can be had on the same shaft S shown in dotted lines in these figures by the correspondingly different positions of the lip seal portions 121', 122' and 123'. Specifically, the larger radial width elastomeric section 141 permits a wider lay-down area A for the polytetrafluoroethylene portion 121' than the narrower radial width elastomeric portion 143 for the narrower or line contact lay-down area A" for the corner of the portion 123. Correspondingly, FIG. IX shows a substantially equal radial width of elastomer and polytetrafluoroethylene portions 142 and 122, and a lay-down area A' intermediate in width to those areas A and A" shown in FIGS. VIII and X, respectively.

In FIG. XI there is shown an assembled seal 105 with the wafer 100 shown in FIG. VII, bonded to a cup-shaped housing 110 as shown in FIGS. VIII, IX and X, and having its polytetrafluoroethylene portion 126 being formed as shown in the last or lower dotted position in FIG. XI. Such a deformation of the polytetrafluoroethylene portions of wafer seals may be made by forming onto a mandrel 80 as shown in FIG. XI, which mandrel 80 has a frusto-conical end over which the assembled lip seals 105 are forced by means of a hollow tubular pushing member 82 or by hand. A plurality of these seals 105 may be retained on a fiberboard tube 84 at the base of the removable mandrel 80, for the purpose of shipment and partial retention of the formed shape.

Another manner of fastening the elastomer portion 147 of a composite washer to a rigid annular housing is shown in FIG. XII and comprises clamping it between a pair of telescoping rigid annular members 130 and 132, which may have different or the same length parallel radial clamping flanges 131 and 133 for controlling the flexibility of the elastomeric portion 147. The clamping is held by crimping over the end 135 of the outer housing member 130 over the adjacent end 136 of the inner member 132. In this embodiment, the deformed polytetrafluoroethylene portion 127 has a sealing edge 150 against a shaft S' and opposite this edge 150 is a seat 129 into which may be placed a garter spring 140, if desired.

In FIG. XIII there is shown a washer or wafer 107 sliced from the billet 55 shown in FIG. IV and formed into a lip seal 155 in which the outer periphery portion 124 is of polytetrafluoroethylene and the inner annular portion 144 is an elastomer. This elastomer 144 herein is shown bonded by means of an adhesive 118 to an inside rigid supporting ring 115 mounted on a central rod or shaft R, while the peripheral lip portion 124 seals against the inside cylindrical surface C of an aperture.

The relatively thin and flexible elastomeric portions of the lip seals of this invention enables these lip seals to seal effectively and continuously shafts with comparatively large runouts or eccentricities, even on start-ups before the heat generated by the friction of the seal has softened the polytetrafluoroethylene so as to load the shaft more uniformly.

It is to be clearly understood that other shapes, sizes and configurations of the composite sealing elements, and particularly their polytetrafluoroethylene portions can be machined into an annular surface before being sliced into wafers.

While there is described above the principles of this invention in connection with specific articles and methods, it is to be clearly understood that this description is made only by way of example and not as a limitation to the scope of this invention.

What is claimed is:

1. A lip seal comprising a substantially uniformly thick annular disc having a polytetrafluoroethylene portion bonded radially concentric to an elastomeric portion, said polytetrafluoroethylene portion being between about 10% and 90% of the radial thickness of said disc, and a rigid concentric annular portion attached to said elastomeric portion of said disc.

2. A seal according to claim 1 wherein said polytetrafluoroethylene portion is between about 20% and 85% of the radial thickness of said disc.

3. A seal according to claim 1 wherein said polytetrafluoroethylene portion is between about 20% and 60% of the radial thickness of said disc.

4. A seal according to claim 1 wherein said elastomeric portion is a rubber.

5. A seal according to claim 1 wherein said elastomeric portion is a polyurethane plastic.

6. A seal according to claim 1 wherein said rigid annular portion is a thermoplastic.

7. A seal according to claim 1 wherein said rigid annular portion is a metal.

8. A seal according to claim 1 wherein said rigid annular portion has an L-shaped radial cross-section.

9. A seal according to claim 8 wherein said rigid annular portion comprises two interfitting members clamping said elastomeric portion between them.

10. A seal according to claim 1 wherein said elastomeric portion is bonded to said rigid annular portion.

11. A seal according to claim 1 wherein said disc has an axial thickness between about 0.008 and 0.125 inches.

* * * * *

UNITED STATES PATENT AND TRADEMARK OFFICE
CERTIFICATE OF CORRECTION

PATENT NO. : 4,243,235
DATED : January 6, 1981
INVENTOR(S) : James A. Repella

It is certified that error appears in the above–identified patent and that said Letters Patent are hereby corrected as shown below:

Column 1, line 56, change "greater" to - - garter - - .

Signed and Sealed this

Twelfth Day of May 1981

[SEAL]

Attest:

RENE D. TEGTMEYER

Attesting Officer     Acting Commissioner of Patents and Trademarks